US008140252B2

(12) United States Patent
Wise et al.

(10) Patent No.: US 8,140,252 B2

(45) Date of Patent: Mar. 20, 2012

(54) SYSTEM AND METHOD FOR DISPLAYING PROTECTED AIRSPACE ASSOCIATED WITH A PROJECTED TRAJECTORY OF AIRCRAFT IN A CONFIDENCE DISPLAY

(75) Inventors: John Anthony Wise, Glendale, AZ (US); Roger W. Burgin, Scottsdale, AZ (US); Blake Wilson, Peoria, AZ (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 585 days.

(21) Appl. No.: 12/331,229

(22) Filed: Dec. 9, 2008

(65) Prior Publication Data

US 2010/0145599 A1 Jun. 10, 2010

(51) Int. Cl.
*G06F 19/00* (2006.01)

(52) U.S. Cl. ........................................ 701/120; 701/300

(58) Field of Classification Search .................. 701/120, 701/121, 122, 208, 200, 300; 342/357.6
See application file for complete search history.

(56) References Cited

U.S. PATENT DOCUMENTS 5,111,400 A 5/1992 Yoder
7,412,324 B1 * 8/2008 Bagge et al. .................. 701/120
2004/0078136 A1 * 4/2004 Cornell et al. ................ 701/120
2005/0200501 A1 9/2005 Smith
2007/0067093 A1 * 3/2007 Pepitone ....................... 701/120
2008/0051947 A1 2/2008 Kemp

FOREIGN PATENT DOCUMENTS

EP 1764759 A1 3/2007
WO 03005326 A1 1/2003

OTHER PUBLICATIONS

Search Report issued on Mar. 3, 2010 for European Application No. 09177551.

* cited by examiner

*Primary Examiner* — Thomas Black
*Assistant Examiner* — Marthe Marc-Coleman
(74) *Attorney, Agent, or Firm* — Ingrassia Fisher & Lorenz, P.C.

(57) ABSTRACT

A display system and method for a display, in real-time, of a confidence display, displaying the protected airspace associated with a projected trajectory of a first aircraft and the protected airspace associated with a projected trajectory of at least one additional aircraft during a phase of flight. The system processes data representative of a phase of aircraft flight of a first aircraft and at least one additional aircraft and determines the protected airspace associated with a projected trajectory of each aircraft based at least in part on the processed data. An image representative of the determined protected airspace of each aircraft is displayed on the display system as a confidence display.

18 Claims, 3 Drawing Sheets

SYSTEM AND METHOD FOR DISPLAYING PROTECTED AIRSPACE ASSOCIATED WITH A PROJECTED TRAJECTORY OF AIRCRAFT IN A CONFIDENCE DISPLAY

TECHNICAL FIELD

The present invention relates to a display for a vehicle and, more particularly, to a system and method for displaying the protected airspace associated with projected trajectories of aircraft in a display.

BACKGROUND

Air Traffic Management (ATM) is expected to dramatically change in the next decade with the implementation of the NextGen system in the US and SESAR (Single European Sky ATM Research) system in Europe. It is anticipated that ATM is going to move from a traditional ground based controller giving vectors to each aircraft from take-off to touch down toward an ATM computer supporting an air traffic controller and ultimately to a total enroute free flight (i.e., no air traffic controller) system, with only terminal areas operating under the direction of air traffic controllers.

Development studies, like the European Union's ERASMUS (En Route Air Traffic Soft Management Ultimate System) program, of intelligent computers supporting human air traffic controller systems, have shown that even when ground based ATM software and/or on-board safety equipment has commanded behaviors in the traffic that will meet the minimum separation requirements between aircraft, controllers and pilots continue to have doubts about the future separation of the aircraft. As a result, pilots often command maneuvers that may result in overly excessive separation, which may cause unnecessary fuel burns and associated emissions. In ERASMUS, for example, a system computer looks approximately 20 minutes into the future. Any place where ERASMUS estimates there will be a breech in the minimum separation standard between aircraft, it attempts to resolve this with small speed changes of the aircraft which are theoretically not perceptible to the controller (i.e., will not cause concern in the controller about what a specific aircraft is doing). At the same time, because the air traffic controllers may not be aware that ERASMUS is solving a future issue that may arise in a different sector, and because the ERASMUS solution is designed to simply maintain separation between aircraft, in many of those cases controllers in system development studies have commanded/performed unnecessary maneuvers (i.e., wasting time and fuel) to obtain a cognitively comfortable feeling about future separation of the aircraft. In one study performed during the ERASMUS development program, approximately 30% of effective ERASMUS solutions were overridden by air traffic controllers.

The current minimum clearance standards between aircraft are relatively conservative given modern technology. The standards were established assuming much poorer accuracies in terms of actual aircraft position. Typically, the standards include a large error budget that creates a need for a significantly larger protective airspace, also referred to as a protective cylinder, around each aircraft. This in turn makes the minimum separation distance between these protective cylinders significantly larger than may be needed with modern technologies, such as NextGen and SESAR.

Today, modern flight management systems (FMS) technologies provide significantly more precise current and future position information, e.g., one nautical mile. Moreover, in ten years when GPS and Galileo are fully operational, accuracy is estimated to be closer to three meters. In addition, data link communication between air traffic controllers and an aircraft (or the aircraft's FMS), aircraft to aircraft communications, and/or FMS to FMS have the potential to dramatically reduce both the total communication and decision making time. In some situations, a pilot may only need to give the FMS permission to carry out the requested action. This capability not only saves the time of reprogramming the FMS, thus dramatically reducing the chance of a maneuvering error, but also eliminates the need for the air traffic controller (or ERASMUS like ground system) to issue a revised clearance.

These above technical improvements have the potential to decrease air traffic control clearance dwell time, reduce flight technical error, and mitigate pilot clearance read back and input errors. These improved efficiencies and faster response rates will mean more aircraft in a smaller given airspace coupled with a commensurate increase in pilot and controller decision making time. However, without some equivalent decision support help for the pilots and controllers, allowing them to quickly and accurately assess aircraft separation so that they feel comfortable with the technology's choices, it is reasonable to expect to see a degradation of potential system efficiency as the pilot and/or controller override the technological decisions because they may not be comfortable with their estimation of future aircraft separation based on what they perceive on their displays.

Hence, there is a need for a display system and method that displays in real-time to pilots and controllers projected accurately scaled aircraft positioning and associated protective airspace of an aircraft and nearby aircraft that may be of interest, thus allowing the pilots and controllers to quickly and accurately assess aircraft separation so that they feel comfortable with modern technologies such as NextGen & SESAR. The present invention addresses one or more of these needs.

BRIEF SUMMARY

The present invention provides a system and method for displaying protected airspace associated with a projected trajectory of aircraft in a confidence display.

In one embodiment, and by way of example only, a display system for displaying protected airspace for projected trajectories of a first aircraft and at least one additional aircraft includes a processor adapted to receive data representative of a first aircraft and at least one additional aircraft and operable, in response thereto, to supply one or more image rendering display commands; and a display device coupled to receive the image rendering display commands and operable, in response thereto, to render a confidence display displaying a scaled image representative of a protected airspace associated with a projected trajectory of the first aircraft and a protected airspace associated with a projected trajectory of the at least one additional aircraft. The display device is configured to display the scaled image in response to a user input.

In another exemplary embodiment, and by way of example only, a display system for displaying protected airspace for projected trajectories of a first aircraft and at least one additional aircraft includes a processor adapted to receive data representative of a first aircraft position and at least one additional aircraft during a phase of flight and a display device coupled to receive the image rendering display commands and operable, in response thereto, to render a confidence display. The processor is operable, in response to the data, to (i) determine a protected airspace associated with a projected trajectory of the first aircraft and a protected airspace associated with a projected trajectory of the at least one additional aircraft; (ii) determine the existence of an area of overlap of the protected airspace associated with the projected flight trajectory of the first aircraft and the protected airspace associated with the projected flight trajectory of the at least one additional aircraft; and (iii) supply one or more image rendering display commands. The confidence display displays a scaled image representative of the protected airspace associated with the trajectory of the first aircraft and the protected airspace associated with the trajectory of the at least one additional aircraft. The display device is configured to display the scaled image in response to a user input.

In another exemplary embodiment, and by way of example only, a method of displaying protected airspace for projected trajectories of a first aircraft and at least one additional aircraft on a display system includes the steps of processing aircraft flight data for a first aircraft, processing aircraft flight data for at least one additional aircraft, determining a protected airspace along a projected trajectory for the first aircraft based at least in part on the processed aircraft flight data, determining a protected airspace along a projected trajectory for the at least one additional aircraft based at least in part on the processed aircraft flight data, and displaying a confidence display image representative of the determined protected airspace along the projected flight trajectory for the first aircraft and the determined protected airspace along the projected flight trajectory for the at least one additional aircraft on display system.

Other independent features and advantages of a system and method for displaying protected airspace associated with a projected trajectory of aircraft in a confidence display will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
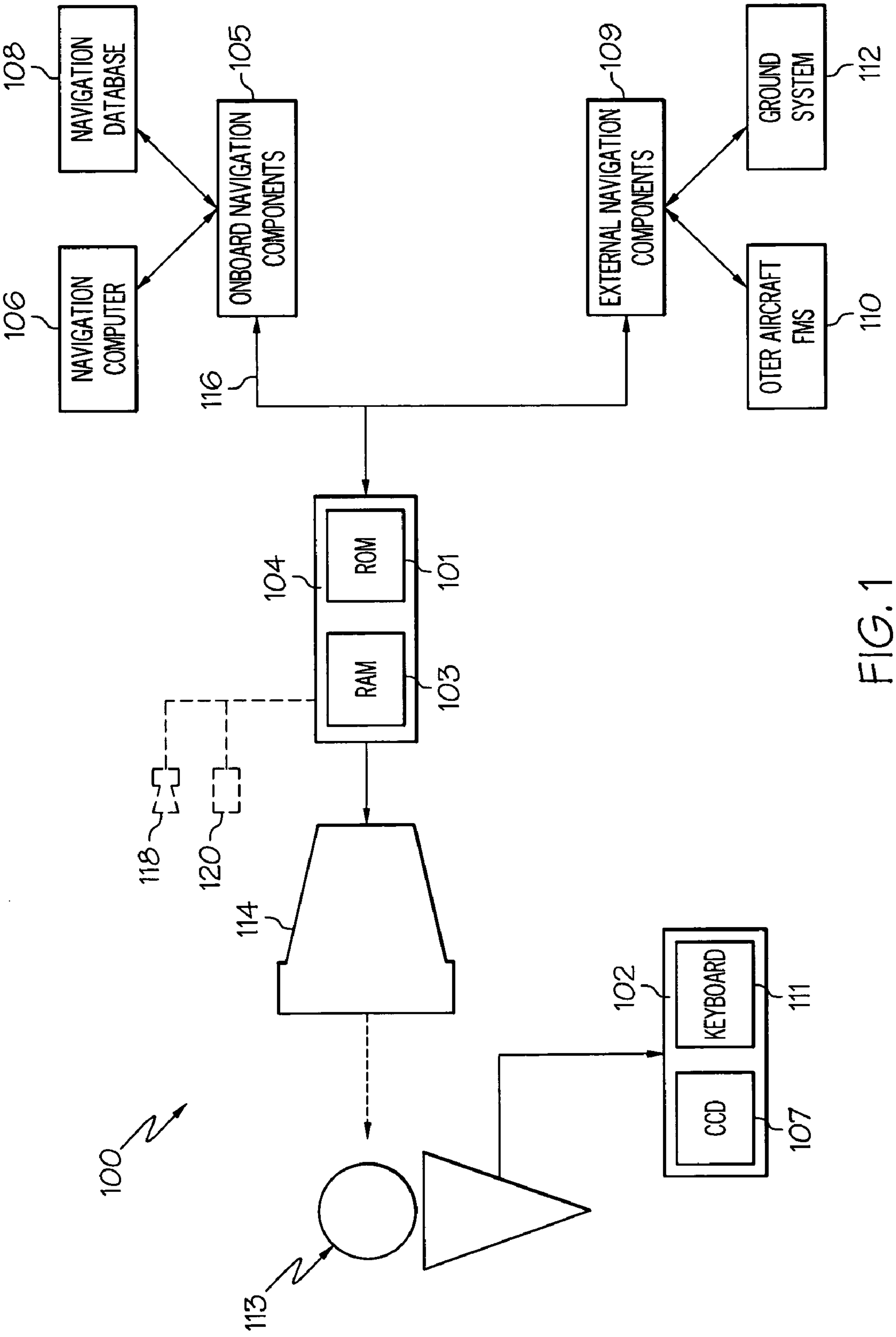
FIG. 1 is a functional block diagram of a display system, including a confidence display, according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

An aircraft Traffic Collision Avoidance System (TCAS), as currently designed, does not enable the pilot or controller to view a display of the protected airspace associated with a projected trajectory of each of a plurality of aircraft as they relate to one another. TCASs currently in use monitor the airspace around aircraft for other aircraft equipped with a corresponding active transponder, independent of air traffic control, and warn pilots of the presence of other transponder-equipped aircraft. The intended function of TCAS is to alert to the aircraft to maintain separation and then provide guidance to aircraft should the projected tracks present a violation of separation standards. The function of the TCAS differs from a confidence display, as described herein, in that the confidence display allows pilots and/or air traffic controllers to instantly determine if there exist or does not exist a threat to losing required minimum separation with a particular aircraft in the future so the crew can make the most cost effective and safe maneuvering decision.

Turning now to the figures, and specifically to FIG. 1, an exemplary display system, such as a flight deck display system, including a confidence display will be described. It should be appreciated that although the display system 100 is described as being an on-board aircraft system, a display system that is ground based is anticipated by this disclosure. The display system 100 may include at least a user interface 102 and a processor 104 in operable communication with onboard navigation components 105 and external navigation components 109. The onboard navigation component 105, such as a navigation computer 106 and one or more optional navigation databases 108, may include, but are not limited to navigation-related data, including various flight plan related data such as, for example, waypoints, distances between waypoints, headings between waypoints, navigational aids, obstructions, special use airspace, political boundaries, communication frequencies, aircraft departure and approach information, protected airspace data, and data related to different airports including, for example, runway-related data. It will be appreciated that the navigation databases 108, or data forming portions thereof, could also be part of one or more devices or systems that are physically separate from the display system 100. The external navigation components 109, such as flight management systems of nearby aircraft 110 and air traffic control ground systems 112, may include a source of weather data, a terrain avoidance and warning system (TAWS), a traffic and collision avoidance system (TCAS), and a runway awareness and advisory system (RAAS), just to name a few. In addition, the display system 100 includes a display device 114. The user interface 102 is in operable communication with the processor 104 and is configured to receive input from a user 113 (e.g., a pilot) and, in response to the user input, supply command signals to the processor 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 113 uses the CCD 107 to, among other things, move a cursor symbol on the display screen, and may use the keyboard 111 to, among other things, input various data.

The processor 104 is in operable communication with the onboard navigation components 105, the external navigation components 109 and the display device 114 via, for example, a communication bus 116. The processor 104 is configured to receive various types of data and is operable to supply appropriate display commands to the display device 114 that cause the display device 114 to render various images. The processor 104 is additionally configured to supply appropriate display commands to the display device 114 at the request and control of the user 113 so that the data supplied from automated external systems may also be selectively displayed on the display device 114.

The processor 104 may include one or more microprocessors, each of which may be any one of numerous known general-purpose microprocessors or application specific processors that operate in response to program instructions. In the depicted embodiment, the processor 104 includes onboard RAM (random access memory) 103, and ROM (read only memory) 105. The program instructions that control the processor 104 may be stored in either or both the RAM 103 and the ROM 101. For example, the operating system software may be stored in the ROM 101, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors. For example, digital logic circuits and analog signal processing circuits could also be used.

The display device 114 is used to display various switchable images and data, in both a graphical and a textual format. It will be appreciated that the display device 114 may be any one of numerous known displays suitable for rendering image and/or text data in a format viewable by the user 113. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display device 114 includes a panel display.

In future automated air traffic control systems, such as an NextGen and/or SESAR like system where a plurality of aircraft are automatically set up so that they all will just pass each other at the required minimum separation distance, an air traffic controller will most likely want to make the clearance larger so that he/she will feel confident and comfortable with the situation to not interfere. This lack of confidence in the automated system is caused by several basic human limitations related to perception and cognition. These basic perceptual and cognitive limits suggest that the only way to allow all the users to be comfortable, effective, and safe in their decision making is to provide them with a decision aid that will allow them to quickly and intuitively be able to determine if they need to change course or speed to avoid a defined conflict. To provide a more complete description of the method that is implemented by the display system 100 in achieving this goal through the incorporation of a confidence display, a general description of the display device 114 and its layout will now be provided.

Figure 2:
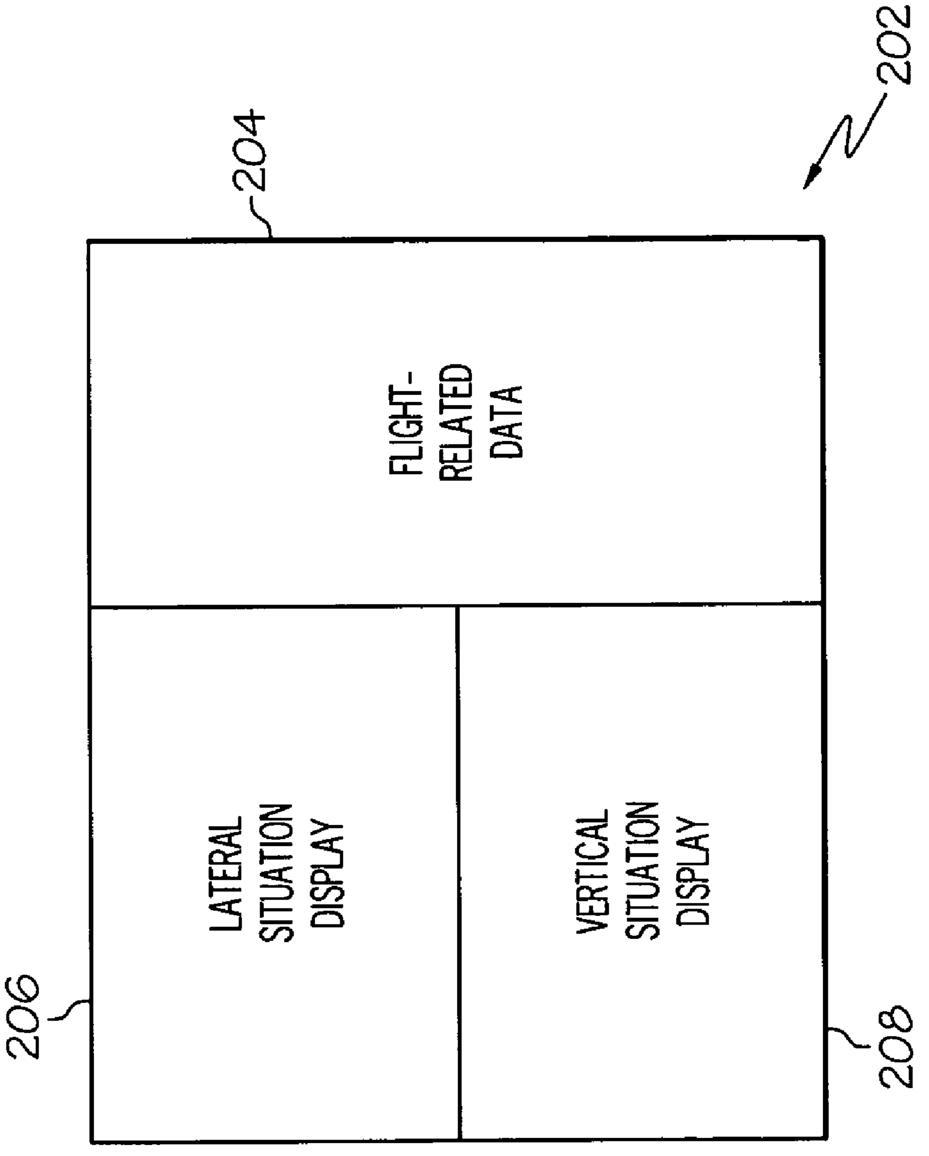
FIG. 2 is a simplified representation of an exemplary display screen that may be used in the system of FIG. 1, which shows the overall layout of the display screen, and on which is various images may be simultaneously displayed in a confidence display.

With reference to FIG. 2, it seen that the display device 114 includes a display area 202 in which multiple graphical and textual images may be simultaneously displayed, preferably in different sections of the display area 202. For example, general flight-related data 204, a lateral situation display 206, and a vertical situation display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards.

The display device 114 is switchable between a standard view format and an alternate view format, controlled by the user in which a confidence display (described presently) is viewable. In the standard view format, the lateral situation display 206 provides a two-dimensional lateral situation view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view symbol and a side-view aircraft symbol, respectively, in addition to various symbols representative of the current flight plan, various navigation aids, and various map features below and/or ahead of the current flight path such as, for example, terrain, runways, and political boundaries. It will be appreciated that in this standard viewing format, the lateral situation display 206 and the vertical situation display 208 preferably use the same scale so that the pilot can easily orient the present aircraft position to either section of the display area 202. It will additionally be appreciated that the processor 104 may implement any one of numerous types of image rendering methods to process the data it receives and render the views displayed therein.

In the alternate view format, a confidence display is viewable in which the lateral situation display 206 provides a two-dimensional lateral situation view of a plurality of aircraft and their projected trajectories illustrating current and future separation distances, and the vertical situation display 208 provides either a two-dimensional profile vertical situation view or a perspective vertical situation view of the plurality of aircraft and their projected trajectories illustrating current and future separation distances. It will be appreciated that in this alternate view format, in which the confidence display is displayed, the lateral situation display 206 and the vertical situation display 208 preferably use accurate scaling with respect to the depiction of the plurality of aircraft, including their wingspan dimension and associated protected airspace. This accuracy in icon depiction better suits the used in processing the information to determine if a future conflict may exist. In a manner similar to the standard view format, the lateral situation display 206 and the vertical situation display 208 preferably use the same scale.

It was noted above that the flight-related data 204, the lateral situation display 206, and the vertical situation display 208 may be displayed either alone or in various combinations. Hence, before proceeding further with the description, it should be appreciated that, for clarity and ease of explanation and depiction, in each of the figures referenced below the lateral situation display 206 and the vertical situation display 208 are shown being displayed in combination in the display area 202 of the display device 114. In addition, is should be appreciated that while a multi-functional display (MFD) is described below, anticipated is a confidence display including views of the plurality of aircraft along their projected flight paths illustrating current and future separation distances and the associated protected air space of each of the plurality of aircraft on a primary flight display (PFD).

Figure 3:
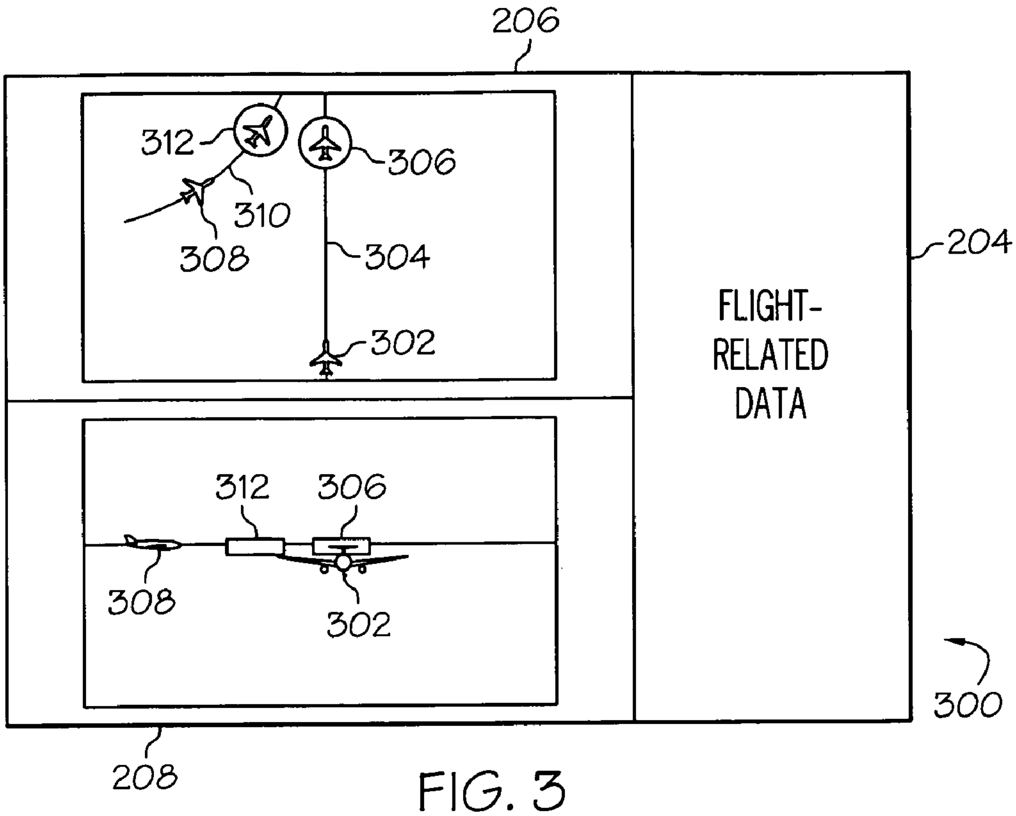
FIG. 3 is an exemplary confidence display screen that depicts a lateral situation view and a vertical situation view of the protected airspace associated with trajectories of a plurality of aircraft during a phase of flight and various other data.
Figure 4:
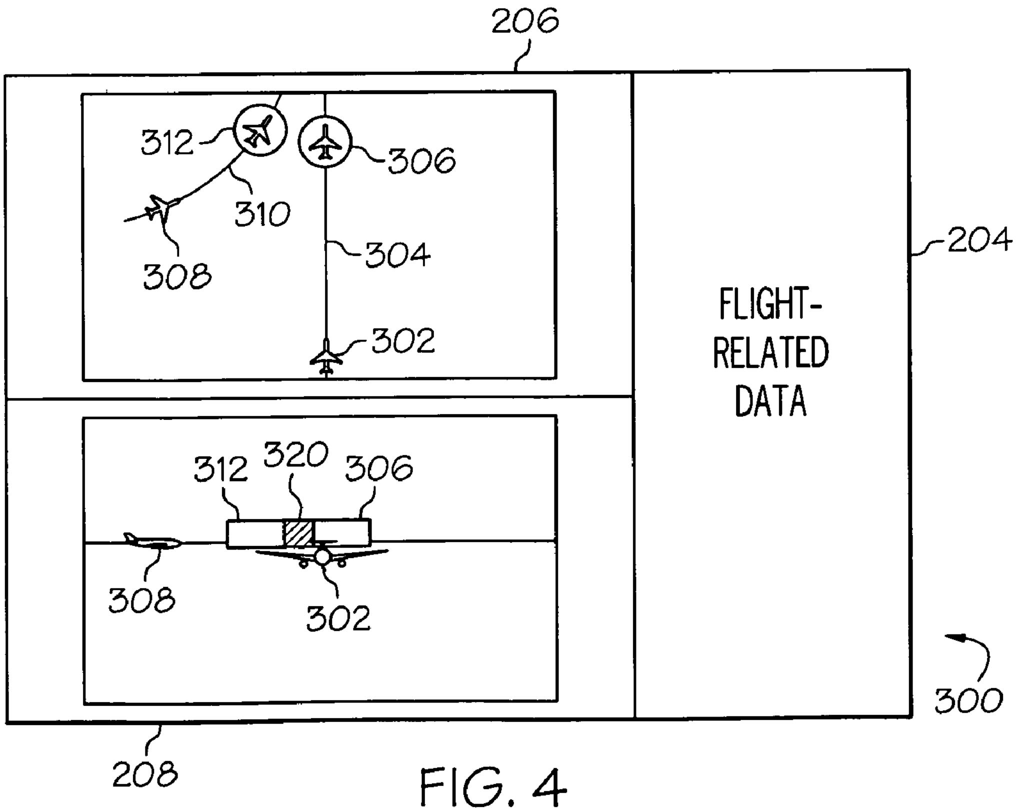
FIG. 4 is another exemplary display screen that depicts a lateral situation view and a vertical situation view of the protected airspace associated with overlapping trajectories of a plurality of aircraft during a phase of flight and various other data.

As previously alluded to, the display device 114 is configured to include a confidence display 300 as best illustrated in FIGS. 3 and 4, showing current and future separation distances of a first aircraft 302 and nearby aircraft 308. The confidence display is configured to address both the perceptual and cognitive issues affecting users of an automated flight system as previously described. With regard to the perceptual aspect are issues that exist with regard to resolution and scale of the display. Given the limits to the physical size of typical cockpit based displays, and even in an air traffic control environment for an air traffic controller, it may be difficult to be able to perceive if two aircraft are at the required minimum separation. A second perceptual issue that influences the confidence of the user is the scale of the icons on the both the ground and cockpit displays that represent each aircraft. For example, in a typical display system configurations the wing span of the aircraft symbols can be displayed as being 20 NM across, therefore even though two aircraft are in excess of the required horizontal separation, the wings of the two symbols visually appear to be overlapping. Although an automated flight system may indicate the required minimum separation distance is current, it would take considerable courage for either pilot or air traffic controller to allow the overlapping of symbol wingtips. In this instance, the pilot or air traffic controller may call up, or switch to an "ON" position, the confidence display 300 to more accurately reflect the protected airspace of each of the aircraft along their projected trajectories and their closest point of encounter.

The cognitive side of the problem involves the inability of humans to make very accurate cognitive predictions of future locations for two or more aircraft based on looking at a typical air traffic control display or a cockpit display of traffic information (CDTI). This cognitive limit is further handicapped by having to make those trend estimations using time-sampled data presented on the operationally low resolution display.

In the alternate view mode, when the user activates the confidence display 300, the processor 104 is adapted to receive data representative of a phase of aircraft flight of a first aircraft and nearby additional aircraft and is operable, in response thereto, to supply one or more image rendering display commands viewable as the confidence display 300, as best illustrated in FIG. 3. More specifically, the processor 104 supplies display commands that cause the lateral situation display 206 to render a two-dimensional lateral situation view of the protected airspace associated with projected flight trajectory of a plurality of aircraft. In the illustrated confidence display 300, the lateral situation display 206 includes a top-view aircraft symbol of a first aircraft 302, a projected flight trajectory 304, and an indicator of a predicted protected air space 306. In addition, the lateral situation display 206 includes a top-view aircraft symbol of a nearby aircraft 308, a projected flight trajectory 310 of the nearby aircraft 308, and an indicator of a predicted protected air space 312 for the nearby aircraft 308. It will be appreciated that while the lateral situation display 206 includes a single nearby aircraft 308, additional aircraft of interest may also be depicted.

The vertical situation display 208 also provides a view of the predicted protected airspace 306, 312 associated with the first aircraft 302 and nearby aircraft 308. The vertical situation display 208 is configured to provide a view of the protected airspace ahead of each of the aircraft so as to depict their closest point of encounter, and may optionally show the terrain and various other symbols and/or data as either a two-dimensional profile vertical situation view or a perspective vertical situation view. In the depicted embodiment, the predicted protected airspace 306 is displayed ahead of the first aircraft 302 and is shown as a perspective vertical situation view. In addition, the predicted protected airspace 312 is displayed ahead of a nearby aircraft 308. It will additionally be appreciated that the processor 104 may implement any one of numerous types of image rendering methods to process aircraft data and render the vertical situation display 208. During use, the pilot or air traffic controller when deemed necessary is capable of calling up the confidence display 300 and in the illustrated embodiment, determining that the minimum clearance standard will not be compromised as indicated by the lack of overlap between the predicted protected airspaces 306 and 312.

In contrast to the embodiment illustrated in FIG. 3, the embodiment illustrated in FIG. 4 indicates an area of overlap 320 in the predicted protected airspaces 306, 312 projected for the first aircraft 302 and 308. More specifically, the confidence display 300 illustrated in FIG. 4 indicates the predicted protected airspace 306 for the projected flight trajectory 304 of the first aircraft 302 is overlapping with the predicted protected airspace 312 for the projected flight trajectory 304 of the nearby aircraft 308. The displayed area of overlap 320 of the predicted protected airspaces 306, 312 provides a visual indicator to the pilot or the air traffic controller that maneuvers must be undertaken to alter the projected flight trajectory path of one or both aircraft 302, 308, irrespective of what an automated control system may indicate.

It was noted above that the flight-related data 204, the lateral situation display 206, and the vertical situation display 208 may be displayed in various combinations. Hence, before proceeding further with the description, it should be appreciated that, for clarity and ease of explanation and depiction, in FIGS. 3 and 4 the lateral situation display 206 and the vertical situation display 208 are shown as being simultaneously displayed together in the display area 202 of the display device 114 (FIG. 1). Furthermore, for purposes of explanation, FIGS. 3 and 4 illustrate the associated predicted protected airspaces 306, 312 for projected aircraft trajectories during an arrival phase of flight. It should be appreciated, that similarly associated protected airspaces may be displayed for projected aircraft trajectories during a departure or enroute phase of flight for the first aircraft 302,308.

The vertical situation display 208 provides a view of the predicted protected airspace 306, 312 ahead of the first aircraft 302, 308, respectively, and may further indicate terrain and various other symbols and/or data as either a two-dimensional profile vertical situation view or a perspective vertical situation view.

In addition to causing the display device 114 to render the confidence display 300 displaying an image of the predicted protected airspace 312 of the first aircraft 302, 308 projected flight trajectories 304, 310, respectively, the processor 104 may also be configured to supply image rendering commands that cause the display device 114 to render advisory indicia. More specifically, an advisory indicia image rendering command may be supplied if received data indicates that an aircraft is tracking on a projected trajectory that would compromise minimum clearance standards. The processor 104 supplies the image rendering command that causes the display device 114 to render the advisory indicia in the confidence display 300.

It will be appreciated that the advisory indicia may be rendered according to any one of numerous paradigms. For example, the color in which a boundary line of the predicted protected airspace 306, 312 or the area of overlap 320 in the predicted protected airspaces 306, 312 could change, in whole or in part, from one color to another. In an alternative exemplary embodiment, the advisory indicia is rendered as a separate symbol or set of symbols, such as text or other images.

It will additionally be appreciated that in still another alternative embodiment, which is shown in phantom in FIG. 1, the display system 100 may be configured such that it additionally supplies visual and/or aural advisory indicia. For example, the display system 100 could be configured to generate an aural warning 118 when an automated system provides data indicative of a nearby aircraft tracking on a projected trajectory so as to indicate predicted overlap of the protected airspace of each aircraft. Alternatively, the display system 100 could generate the aural warning 118 along with a visual indicator 120, either on the display device 114 or a separate dedicated visual indicator. It will be appreciated that this aural warning could be implemented in anyone of numerous ways such as, for example, a buzzer, horn, alarm, or a voice indicator. In the depicted embodiment, this aural indicator is generated by processor 104; however, it will be appreciated that it could additionally be generated by a processor in any one of numerous other external systems or devices.

Basic human perceptual and cognitive limitations suggest that the only way to allow pilots and/or air traffic controllers to be comfortable, effective, and safe in their decision making capabilities, is to provide them with a decision aid that allows them to quickly and intuitively correctly determine if they need to change course and/or speed to avoid compromising minimum required separation standards.

In an attempt to enable air traffic controllers and pilots to feel confident that the minimum required separation standards between aircraft will be maintained, and thus achieve optimal system efficiency, they must possess the comfort/confidence to follow the path generated by the automated flight system. This will become even more evident for pilots performing their own self separation in future systems such as NextGen in the USA and SESAR in Europe. The previously described display system including a confidence display provides individuals utilizing these automated systems to reach the point that will allow them to regularly fly at or near the established boundaries by eliminating the perceptual and cognitive limitations that have created the current conservative behaviors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A display system for displaying protected airspace for projected trajectories of a first aircraft and at least one additional aircraft, comprising:

a processor adapted to receive data representative of a first aircraft and at least one additional aircraft and operable, in response thereto, to supply one or more image rendering display commands; and a display device coupled to receive the image rendering display commands and operable, in response thereto, to render (i) a confidence display displaying a scaled image representative of a protected airspace associated with a projected trajectory of the first aircraft (ii) a protected airspace associated with a projected trajectory of the at least one additional aircraft and (iii) a scaled icon imagery accurately depicting aircraft wingspan and a protected airspace surrounding the aircraft, wherein the display device is configured to display the scaled image in response to a user input.

2. The system of claim 1, wherein the display device is operable to render a two-dimensional lateral situation view image representative of the protected airspace associated with a trajectory of the first aircraft and the protected airspace associated with a trajectory of the at least one additional aircraft.

3. The system of claim 1, wherein the display device is operable to render a perspective view image representative of the protected airspace associated with a trajectory of the first aircraft and the protected airspace associated with a trajectory of the at least one additional aircraft.

4. The system of claim 1, wherein the data representative a first aircraft and at least one additional aircraft comprises position data representative of each aircrafts' current location.

5. The system of claim 1, wherein the data representative of a first aircraft and at least one additional aircraft comprises data representative of an en route phase of flight.

6. The system of claim 1, wherein the data representative of a first aircraft and at least one additional aircraft comprises data representative of one of arrival phase of flight and a departure phase of flight.

7. The system of claim 1, wherein the system is configured as an on board aircraft flight display system.

8. The system of claim 1, wherein the system is configured as a ground based display system.

9. The system of claim 1, wherein the processor is further adapted to supply one or more image rendering display commands and the display device is coupled to receive the image rendering display commands and operable, in response thereto, to render an image indicative of an area of overlap of a protected airspace associated with the first aircraft and the protected airspace associated with the at least one additional aircraft.

10. The system of claim 1, wherein the display device is configured to be operably switchable by a user between a standard view mode and an alternate view mode displaying the confidence display.

11. A display system for displaying protected airspace for projected trajectories of a first aircraft and at least one additional aircraft, comprising:

a processor adapted to receive data representative of a first aircraft position and at least one additional aircraft during a phase of flight, the processor operable, in response to the data, to (i) determine a protected airspace associated with a projected trajectory of the first aircraft and a protected airspace associated with a projected trajectory of the at least one additional aircraft; (ii) determine the existence of an area of overlap of the protected airspace associated with the projected flight trajectory of the first aircraft and the protected airspace associated with the projected flight trajectory of the at least one additional aircraft; and (iii) supply one or more image rendering display commands; and a display device coupled to receive the image rendering display commands and operable, in response thereto, to render a confidence display displaying a scaled image representative of the protected airspace associated with the trajectory of the first aircraft and the protected airspace associated with the trajectory of the at least one additional aircraft, wherein the display device is configured to display the scaled image in response to a user input.

12. The system of claim 11, wherein the display device is operable to render a two-dimensional lateral situation view image representative of the protected airspace associated with a trajectory of the first aircraft and the protected airspace associated with a trajectory of the at least one additional aircraft.

13. The system of claim 11, wherein the display device is operable to render a perspective view image representative of the protected airspace associated with a trajectory of the first aircraft and the protected airspace associated with a trajectory of the at least one additional aircraft.

14. The system of claim 11, wherein the display device is configured to render a scaled icon imagery accurately depicting aircraft wingspan and a protected airspace surrounding the aircraft.

15. The system of claim 11, wherein the system is configured as an on board aircraft flight display system.

16. The system of claim 11, wherein the system is configured as a ground based display system.

17. A method of displaying protected airspace for projected trajectories of a first aircraft and at least one additional aircraft on a display system, the method comprising the steps of:

processing aircraft flight data for a first aircraft;

processing aircraft flight data for at least one additional aircraft;

determining a protected airspace along a projected trajectory for the first aircraft based at least in part on the processed aircraft flight data;

determining a protected airspace along a projected trajectory for the at least one additional aircraft based at least in part on the processed aircraft flight data;

determining the existence of an area of overlap of the protected airspace associated with the projected trajectory of the first aircraft and the protected airspace associated with the projected trajectory of the at least one additional aircraft; and displaying a confidence display image representative of the determined protected airspace along the projected flight trajectory for the first aircraft and the determined protected airspace along the projected flight trajectory for the at least one additional aircraft on display system.

18. The method of claim 17, wherein the protected airspace along the projected flight trajectory for the first aircraft and the protected airspace along the projected flight trajectory for the at least one additional aircraft is displayed on the display as at least one of a two-dimensional image and a perspective view image.

* * * * *